(12) United States Patent
Matsumoto

(10) Patent No.: US 7,066,160 B2
(45) Date of Patent: Jun. 27, 2006

(54) FAILURE DIAGNOSIS SYSTEM FOR EXHAUST GAS RECIRCULATION DEVICE

(75) Inventor: Takuya Matsumoto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/071,157

(22) Filed: Mar. 4, 2005

(65) Prior Publication Data

US 2005/0199216 A1    Sep. 15, 2005

(30) Foreign Application Priority Data

Mar. 12, 2004 (JP) ............................. 2004-071491

(51) Int. Cl.
*F02B 47/08* (2006.01)
*F02B 47/10* (2006.01)

(52) U.S. Cl. .................. 123/568.16; 123/90.15
(58) Field of Classification Search .......... 123/568.16, 123/568.22, 568.24, 90.15, 568.11
See application file for complete search history.

(56) References Cited

U.S. PATENT DOCUMENTS

| | | | | |
|---|---|---|---|---|
| 5,488,938 A | * | 2/1996 | Ohuchi | ................. 123/568.16 |
| 5,513,616 A | * | 5/1996 | Matsumoto et al. | ... 123/568.16 |
| 6,389,804 B1 | * | 5/2002 | Yasui et al. | .................... 60/277 |
| 6,390,077 B1 | * | 5/2002 | Simpson et al. | ....... 123/568.16 |
| 6,564,778 B1 | * | 5/2003 | Isobe et al. | ................. 123/479 |
| 6,609,059 B1 | * | 8/2003 | Kawaguchi et al. | ........ 701/104 |
| 6,748,936 B1 | * | 6/2004 | Kinomura et al. | ..... 123/568.22 |
| 6,848,418 B1 | * | 2/2005 | Summers et al. | ...... 123/339.11 |

FOREIGN PATENT DOCUMENTS

| JP | (A) 05001624 | 1/1993 |
|---|---|---|
| JP | (A) 07004320 | 1/1995 |

* cited by examiner

*Primary Examiner*—Mahmoud Gimie
(74) *Attorney, Agent, or Firm*—Kenyon & Kenyon LLP

(57) ABSTRACT

An engine ECU of a failure diagnosis system for an EGR device fixes a VVT to a most retarded position upon establishment of a failure monitor condition of the EGR device, starts the EGR device, measures an actual intake pipe pressure PMON upon elapse of a predetermined time after start of EGR device, stops the EGR device, measures an actual intake pipe pressure PMOFF upon elapse of a predetermined time after stop of EGR device, and determines that the EGR device is normally operated when a value obtained by subtracting the actual PMOFF in OFF state of the EGR device from the actual PMON in ON state of the EGR device is larger than a predetermined judgment value.

1 Claim, 5 Drawing Sheets

FAILURE DIAGNOSIS SYSTEM FOR EXHAUST GAS RECIRCULATION DEVICE

The disclosure of Japanese Patent Application No. 2004-71491 filed on Mar. 12, 2004, including the specification, drawings and abstract are incorporated herein by reference in its entirety.

BACKGROUND OF THE INVENTION

1. Field of Invention

The invention relates to an exhaust gas recirculation device that partially recirculates exhaust gas discharged from an internal combustion engine into an intake pipe thereof, and particularly, to a failure diagnosis system for diagnosing a failure in the exhaust gas recirculation device.

2. Description of Related Art

An exhaust gas recirculation (hereinafter referred to "EGR") device for partially recirculating the exhaust gas discharged from the internal combustion engine into an intake pipe thereof has been widely employed in the internal combustion engine for a vehicle so as to reduce nitrogen oxides ($NO_x$) contained in the exhaust gas and to improve fuel efficiency. When failure in the operation of the EGR device is caused by abnormality in an operation of an EGR valve or an EGR pipe, the amount of generated $NO_x$ is likely to be increased. The failure in the EGR device, however, hardly influences the performance of the EGR device itself. This may keep the vehicle operator from becoming aware of the abnormality in the EGR device. Accordingly a large amount of $NO_x$ may be discharged to atmosphere, leading to air pollution.

The technology for detecting the failure in the EGR device as aforementioned has been proposed in publications, for example, JP-A-5-1624 or JP-A-7-4320 so as to solve the aforementioned problem.

JP-A-5-1624 discloses a failure diagnosis system for an exhaust gas recirculation control device in which the accuracy for detecting abnormality in the EGR device is improved upon its ON/OFF operations. The failure diagnosis system for the exhaust gas recirculation control device is provided with a recirculation pipe that recirculates the exhaust gas discharged from the internal combustion engine into an intake pipe, a recirculation valve that controls a flow rate of the exhaust gas flowing through the recirculation pipe, a recirculation valve passage area control unit that controls a passage area of the recirculation valve, an operation condition detection unit that detects an operation condition of the internal combustion engine, a memory unit that stores a first detection value detected by the operation condition detection unit when the passage area of the recirculation valve which is brought into a first state where the passage area is relatively large by the recirculation valve passage area control unit, a memory unit that stores a second detection value detected by the operation condition detection unit when the passage area of the recirculation valve which is brought into a second state where the passage area is relatively narrow or zero by the recirculation valve passage area control unit, and a determination unit for diagnosing the failure based on at least the first and the second detection values. The determination unit serves to diagnose the failure in a predetermined area except a high load area where the detection value detected by the operation condition detection unit indicates larger loss in the recirculation pipe, and a low load area where the flow rate of the exhaust gas flowing through the recirculation pipe is small.

In the failure diagnosis system for the exhaust gas recirculation control device, upon detection of the abnormality in the EGR device by tuning ON/OFF thereof, the failure determination area is limited depending on the load. This makes it possible to detect the failure in ON state of the EGR device and in an area where the detection value such as the difference in the intake manifold pressures between ON state and OFF state of the EGR device is large. The failure is detected only when the flow rate of the exhaust gas recirculated by the EGR device is equal to or lower than a predetermined value. Accordingly, fluctuation in the torque upon ON/OFF operations of the EGR device may be reduced.

JP-A-7-4320 discloses an exhaust gas recirculation control device capable of accurately diagnosing abnormality in an exhaust gas recirculation device. The exhaust gas recirculation control device is provided with a recirculation pipe that recirculates the exhaust gas discharged from the internal combustion engine into an intake pipe, a recirculation pipe operation device that opens or closes the recirculation pipe, an intake air condition unit that detects a condition of air flowing through the intake pipe, a first control unit that controls an opening degree of the recirculation pipe operation device between a first value and a second value that is smaller than the first value, a first change amount detection unit that detects a change amount of the condition of air flowing through the intake pipe when the recirculation pipe operation device is operated by the first control unit, a first determination unit that determines whether a detection result of the first change amount detection unit is smaller than a predetermined amount, a second control unit that changes the opening degree of the recirculation pipe operation device by the difference in the opening degree larger than the one that has been changed by the first control unit when it is determined that the change amount detected by the first change amount detection unit is smaller than the predetermined amount, a second change amount detection unit that detects a change amount of the condition of air flowing through the intake pipe when the operation of the recirculation pipe operation device is changed by the second control unit, and a second determination unit that determines the exhaust gas recirculation device as being abnormality when a detection result of the second change amount detection unit is smaller than the predetermined value.

In the exhaust gas recirculation control device, when the EGR device is in a normal operation state, the operation state of the EGR device is generally detected as being normal by the first determination unit. In the case where the EGR rate obtained during detection of abnormality in the EGR device is small, the operation state may be detected as being abnormal by the first determination unit contrary to the fact that the actual operation state is normal. In the aforementioned case, the EGR rate is increased, and then the determination is made with respect to abnormality in the operation state by the second determination unit. The operation state at this stage may at least be determined as being normal. This makes it possible to prevent the false determination with respect to the operation state from being made as abnormal contrary to the actual normal operation state. When the operation state of the EGR device is abnormal, it may be determined as being abnormal with certainty by the second determination unit. In the aforementioned exhaust gas recirculation control device, the determination with respect to the abnormality in the EGR device will be made again at the increased EGR rate only when the first determination unit does not determine the EGR device as being in the normal operation state. Accordingly this makes it possible to prevent increase in the exhaust gas caused by unnecessarily increasing the EGR rate.

In the failure diagnosis system for an EGR control device disclosed in JP-A-5-1624 or the EGR control device disclosed in JP-A-7-4320, when the EGR device is normally operated, the exhaust gas is recirculated into the intake manifold. Accordingly the pressure change or change in the flow rate at the intake manifold is detected upon ON/OFF operations of the EGR device, based on which the abnormality diagnosis with respect to the abnormality in the EGR device may be performed.

When the intake air flow rate in the intake manifold changes in the normal operation state of the EGR device, it is difficult to determine whether the change in the pressure or the flow rate detected at the intake manifold has been caused by the failure in the EGR device or by the change in the intake air flow rate. Accordingly the failure diagnosis with respect to the EGR device cannot be performed accurately. For example, in the case where the operation timing of the intake valve is controlled by the variable valve timing mechanism that controls the intake/exhaust valve variably, the pressure or the flow rate at the intake manifold may be changed.

SUMMARY OF THE INVENTION

It is an object of the invention to provide a failure diagnosis system that allows an accurate failure diagnosis with respect to the exhaust gas recirculation device.

A failure diagnosis system for an exhaust gas recirculation device provided in an internal combustion engine for recirculating a part of an exhaust gas into an intake pipe of the internal combustion engine via a recirculation valve includes a detection unit that detects a condition of air flowing through the intake pipe of the internal combustion engine, a control unit that interrupts a control executed by a variable intake air flow rate device that varies a flow rate of intake air introduced into a combustion chamber of the internal combustion engine, and a diagnosis unit that diagnoses a failure in the exhaust gas recirculation device based on the condition of air detected by the detection unit in a state where the control executed by the variable intake air flow rate device that varies the flow rate of intake air is interrupted by the control unit.

According to the invention, the failure diagnosis is performed with respect to the exhaust gas recirculation device that partially recirculates the exhaust gas into the intake pipe of the internal combustion engine via the recirculation valve while interrupting the control that may change the flow rate of the intake air by the intake air flow rate variable mechanism. That is, the failure in the exhaust gas recirculation device may be accurately diagnosed based on the change in the pressure or the flow rate at the intake manifold upon ON/OFF operations of the exhaust gas recirculation device so as not to cause the change in the flow rate at the intake manifold owing to the factor other than the failure in the exhaust gas recirculation device. Accordingly the failure diagnosis system allows the accurate diagnosis of the failure with respect to the exhaust gas recirculation device.

In the aforementioned failure diagnosis system, the variable intake air flow rate device is formed as a variable valve timing mechanism.

According to the invention, when the operation timing or the valve lift amount of the intake/exhaust valves is controlled for the purpose of improving output performance or fuel efficiency of the internal combustion engine, the intake flow rate at the intake manifold may be changed. Even if the exhaust gas cannot be sufficiently recirculated owing to the failure in the exhaust gas circulation device, such failure cannot be detected under the control of the variable valve timing mechanism to increase the intake air flow rate. According to the invention, the failure in the exhaust gas recirculation device is diagnosed without changing the operation timing or the valve lift amount of the intake/exhaust valve. This makes it possible to have an accurate failure diagnosis with respect to the exhaust gas recirculation device.

In the aforementioned failure diagnosis system, the variable valve timing mechanism is formed as a mechanism that allows a timing for operating a valve to be changed with respect to a crank angle.

According to the invention, when the operation timing of the intake/exhaust valves is controlled for the purpose of improving the output performance or the fuel efficiency of the internal combustion engine, the intake air flow rate at the intake manifold may be changed. Even if the exhaust gas cannot be sufficiently recirculated owing to the failure in the exhaust gas recirculation device, such failure cannot be detected under the control of the variable valve timing mechanism to increase the intake air flow rate. According to the invention, the failure in the exhaust gas recirculation device is diagnosed without changing the operation timing of the intake/exhaust valves. This makes it possible to have an accurate failure diagnosis with respect to the exhaust gas recirculation device.

In the aforementioned failure diagnosis system, the variable valve timing mechanism is capable of changing a valve lift amount.

According to the invention, when the lift amount of the intake/exhaust valves is controlled for the purpose of improving the output performance or the fuel efficiency of the internal combustion engine, the intake air flow rate at the intake manifold may be changed. Even if the exhaust gas cannot be sufficiently recirculated owing to the failure in the exhaust gas recirculation device, such failure cannot be detected under the control of the variable valve timing mechanism to increase the intake air flow rate. According to the invention, the failure in the exhaust gas recirculation device is diagnosed without changing the lift amount of the intake/exhaust valves. This makes it possible to have an accurate failure diagnosis with respect to the exhaust gas recirculation device.

In the aforementioned failure diagnosis system, the variable intake air flow rate device is formed as a throttle valve that controls the intake air flow rate.

According to the invention, the failure in the exhaust gas recirculation device is diagnosed without changing the opening degree of the throttle valve. This makes it possible to have an accurate failure diagnosis with respect to the exhaust gas recirculation device.

In the aforementioned failure diagnosis system, the variable intake air flow rate device comprises an idle speed control valve that controls the intake air flow rate.

According to the invention, the failure in the exhaust gas recirculation device is diagnosed without changing the opening degree of the idle speed control valve. This makes it possible to have an accurate failure diagnosis with respect to the exhaust gas recirculation device.

In the aforementioned failure diagnosis system, the variable intake air flow rate device comprises a control valve that introduces a fuel evaporation gas into the intake pipe.

According to the invention, the fuel evaporation gas stored in a charcoal canister is introduced into the intake port so as to be burned. Under the aforementioned control, the intake air flow rate may be changed. According to the invention, the failure in the exhaust gas recirculation device is diagnosed without changing the opening degree of the control valve through which the fuel evaporation gas is introduced. This makes it possible to have an accurate failure diagnosis with respect to the exhaust gas recirculation device.

A failure diagnosis system for an exhaust gas recirculation device provided in an internal combustion engine for recirculating a part of an exhaust gas into an intake pipe of the internal combustion engine via a recirculation valve includes a detection unit that detects a condition of air flowing through the intake pipe of the internal combustion engine, a control unit that interrupts a control executed by a fuel injection control mechanism that controls a fuel injection into a combustion chamber of the internal combustion engine, and a diagnosis unit that diagnoses a failure in the exhaust gas recirculation device based on the condition of air detected by the detection unit in a state where the control executed by the fuel injection control mechanism is interrupted by the control unit.

In the aforementioned invention, the internal combustion engine is controlled by changing the time for applying electricity to the injector by the fuel injection control mechanism so as to achieve an optimum combustion state. In this case, the fuel injection quantity is controlled based on the operation state of the internal combustion engine detected by various sensors, and the control is further executed such that the intake air flow rate becomes the value suitable for the fuel injection quantity. However, this may fail to accurately determine the failure in the exhaust gas recirculation device based on the change in the pressure or the flow rate at the intake manifold upon ON/OFF states of the exhaust gas recirculation device when the intake flow rate at the intake manifold changes owing to the factor other than the exhaust gas recirculation device. Accordingly the failure in the exhaust gas recirculation device is diagnosed in the state where the control executed by the fuel injection control mechanism is interrupted. This makes it possible to have an accurate failure diagnosis with respect to the exhaust gas recirculation device.

A failure diagnosis system for an exhaust gas recirculation device provided in an internal combustion engine for recirculating a part of an exhaust gas into an intake pipe of the internal combustion engine via a recirculation valve includes a detection unit that detects a condition of air flowing through the intake pipe of the internal combustion engine, a control unit that interrupts a control executed by an ignition timing control mechanism that controls an ignition timing for the internal combustion engine, and a diagnosis unit that diagnoses a failure in the exhaust gas recirculation device based on the condition of air detected by the detection unit in a state where the control executed by the ignition timing control mechanism is interrupted by the control unit.

In the aforementioned invention, the internal combustion engine is controlled by changing the ignition timing for the igniter by the ignition timing control mechanism so as to achieve an optimum combustion state. In this case, the ignition timing is controlled based on the operation state of the internal combustion engine, and the control is further executed such that the intake air flow rate becomes the value suitable for the ignition timing. However, this may fail to accurately determine the failure in the exhaust gas recirculation device based on the change in the pressure or the flow rate at the intake manifold upon ON/OFF states of the exhaust gas recirculation device when the intake flow rate at the intake manifold changes owing to the factor other than the exhaust gas recirculation device. Accordingly the failure in the exhaust gas recirculation device is diagnosed in the state where the control executed by the ignition timing control mechanism is interrupted. This makes it possible to have an accurate failure diagnosis with respect to the exhaust gas recirculation device.

A failure diagnosis system for an exhaust gas recirculation device provided in an internal combustion engine for recirculating a part of an exhaust gas into an intake pipe of the internal combustion engine via a recirculation valve includes a detection unit that detects a condition of air flowing through the intake pipe of the internal combustion engine, a control unit that interrupts a control executed by an air flow control valve system that controls an air flow within a combustion chamber of the internal combustion engine, and a diagnosis unit that diagnoses a failure in the exhaust gas recirculation device based on the condition of air detected by the detection unit in a state where the control executed by the air flow control valve system is interrupted by the control unit.

In the aforementioned failure diagnosis system, the detection unit includes a device that detects one of a pressure and a flow rate of air within the intake pipe.

According to the invention, the change in the pressure or the flow rate at the intake manifold upon ON/OFF operations of the exhaust gas recirculation device is detected while preventing the change in the intake air flow rate at the intake manifold caused by the factor other than the exhaust gas recirculation device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENT

Figure 1:
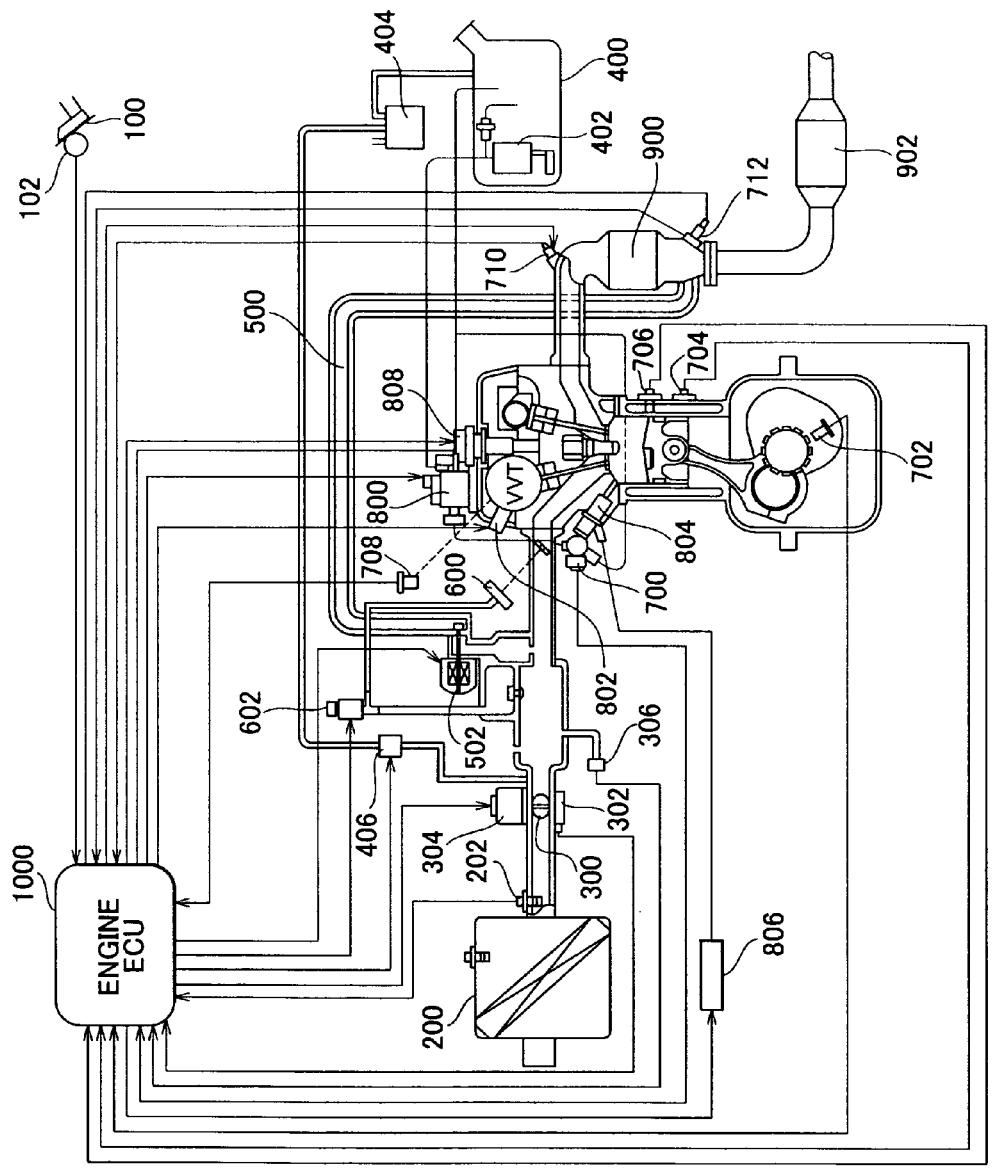
FIG. 1 is a view representing an engine system of a vehicle to which an EGR failure diagnosis system according to an embodiment of the invention is applied.

An embodiment of the invention will be described referring to the drawings. The same elements will be designated with the same reference numerals, and accordingly, descriptions and functions of those respective elements are identical. The detailed explanation of those elements, thus, will not be described repeatedly.

Referring to FIG. 1, an engine system of a vehicle including an engine ECU (Electric Control Unit) that realizes an EGR failure diagnosis system according to the embodiment will be explained.

Referring to FIG. 1, in the engine system, air is introduced into a combustion chamber of the engine through an air cleaner 200. During introduction of air, a flow rate of the intake air is detected by an air flow meter 202, and a signal indicating the intake air flow rate is input to an engine ECU 1000. The intake air flow rate is changed by adjusting an opening degree of a throttle valve 300. The opening degree of the throttle valve 300 is changed by a throttle motor 304 operated in accordance with a signal from the engine ECU 1000. The opening degree of the throttle valve 300 is detected by a throttle position sensor 302, and a signal indicating the opening degree of the throttle valve 300 is input to the engine ECU 1000.

The fuel stored in a fuel tank 400 is injected by a fuel pump 402 into the combustion chamber from a high pressure fuel injector 804 via a high pressure fuel pump 800. Mixture of air introduced from the intake manifold and the fuel injected into the combustion chamber from the fuel tank 400 through the high pressure fuel injector 804 is ignited and burned with an ignition coil 808 combined with an igniter to which a control signal is input from the engine ECU 1000.

The exhaust gas generated by burning the air/fuel mixture is discharged into atmosphere through the exhaust manifold, and three-way catalytic converters 900, 902, respectively.

As shown in FIG. 1, the engine system is provided with an EGR device in which the flow rate of the exhaust gas flowing from the downstream side of the three-way catalytic converter 900 to an EGR pipe 500 is controlled by an EGR valve 502. The EGR device or the exhaust gas recirculation device serves to recirculate a part of the exhaust gas discharged from the engine into the intake system so as to be mixed with new air/fuel mixture. As a result, the combustion temperature is reduced to restrain generation of nitrogen oxides ($NO_x$) and to improve the fuel efficiency by restraining the pumping loss.

Figure 2:
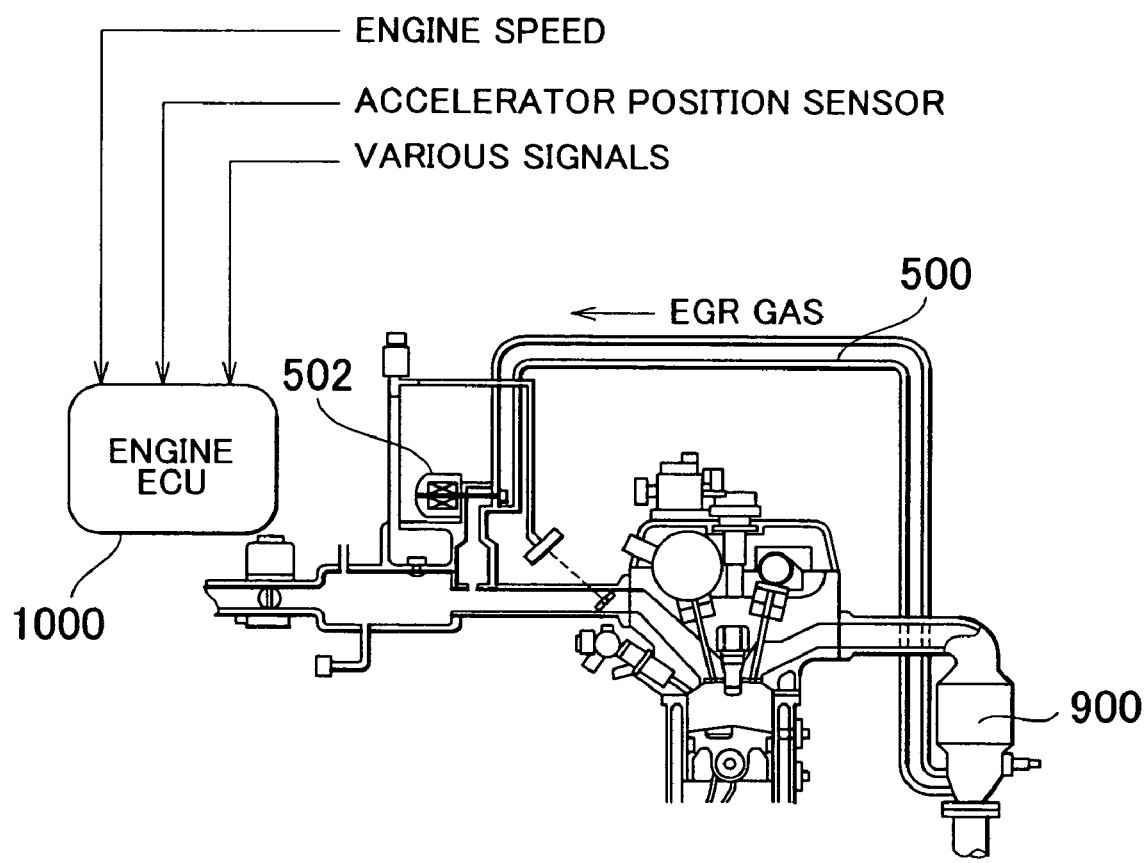
FIG. 2 is an enlarged view of an EGR device.
Figure 3:
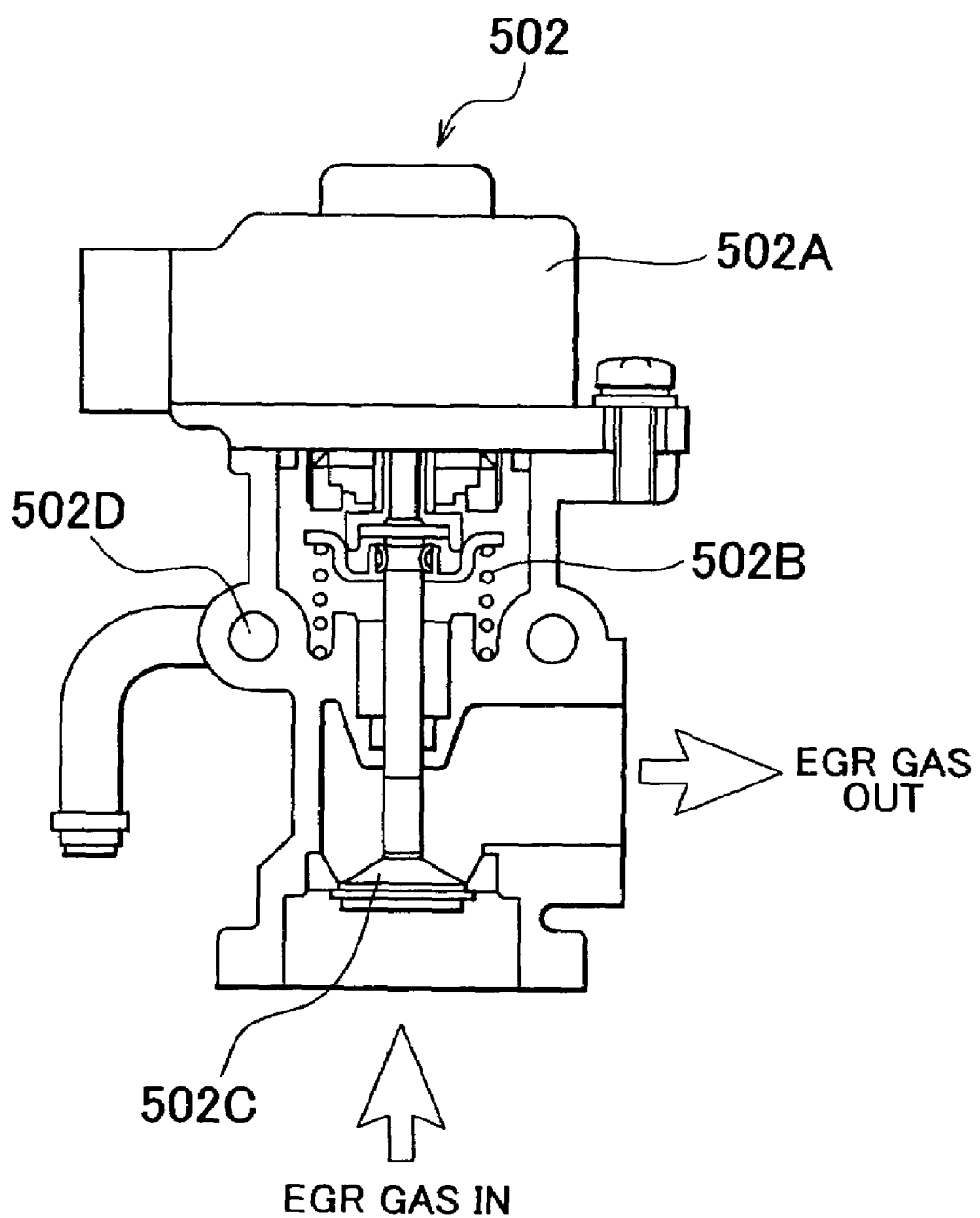
FIG. 3 is an enlarged view of an EGR valve.

FIG. 2 is a partially enlarged view of the EGR device shown in FIG. 1. FIG. 3 is a partially enlarged view of the EGR valve 502 of the EGR device.

Referring to FIGS. 2 and 3, the EGR gas, that is, the exhaust gas passing through the three-way catalytic converter 900 flows through the EGR pipe 500 so as to be introduced into the EGR valve 502. The EGR valve 502 is subjected to a duty control executed by the engine ECU 1000 which controls an opening degree of the EGR valve 502 based on various signals indicating, for example, an engine speed, a signal from an accelerator position sensor 102, and the like.

Referring to FIG. 3, the EGR valve 502 includes a stepping motor 502A activated upon receipt of a control signal from the engine ECU 1000, a poppet valve 502C having its opening degree linearly controlled by the stepping motor 502A, and a return spring 502B. As the high temperature EGR gas recirculated into the combustion chamber may give an adverse influence on performance or durability of the EGR valve 502, the EGR device is provided with a cooling water passage 502D for cooling with engine cooling water.

Clogging in the EGR pipe 500, or lock of the poppet valve 502C may cause the failure in the EGR device. The EGR failure diagnosis system according to the embodiment of the invention is capable of accurately detecting such failure in the EGR device with the program executed by the engine ECU 1000.

In addition to the EGR device, the above structured engine system includes systems as described below.

The engine system is equipped with a fuel injection control system for controlling the fuel injection quantity based on the intake air flow rate detected by the air flow meter 202 and a vacuum sensor 306. The engine ECU 1000 executes control of the fuel injection quantity and the fuel injection timing corresponding to the engine speed and the engine load such that the burning state becomes optimum based on signals from various sensors.

In the engine system, the fuel injection quantity is determined in accordance with the engine speed and the intake air flow rate (detected by the vacuum sensor 306 and the air flow meter 202). The air/fuel ratio after start-up is feedback controlled based on the signals from $O_2$ sensors 710, 712. Under the fuel injection control, the fuel injection timing control and the fuel injection quantity control are executed to correct the basic injection time calculated in accordance with the engine operation state with the signals of various sensors.

The engine system includes an ignition timing control system. The engine ECU 1000 calculates an optimum ignition timing based on signals from various sensors so as to output an ignition signal to the ignition coil 808 combined with the igniter. The ignition timing is determined by the initially set ignition timing or the basic advance angle and the corrected advance angle. The engine system includes a knock control system which retards the ignition timing at a predetermined angle until no knocking occurs upon detection of knocking by a knock sensor 704. When the knocking no longer occurs, the angle is increased at a predetermined angle by the knock control system.

The engine ignition timing is calculated by the engine ECU 1000 in accordance with the engine operation state based on signals indicating the engine speed, cam position, intake flow rate, opening degree of the throttle valve, engine cooling water temperature and the like. The resultant ignition signal is output to the ignition coil 808 combined with the igniter. Under the ignition timing control, the basic ignition timing calculated in accordance with the engine operation state is corrected using signals from various sensors so as to obtain an appropriate ignition timing.

The engine system further includes a throttle control system. In the throttle control system, the opening degree of the throttle valve 300 which has been calculated in accordance with the engine operation state is corrected using the signals from various sensors so as to obtain the appropriate opening degree. The engine ECU 1000 executes the control such that the opening degree of the throttle valve 300 becomes an appropriate value in accordance with the engine combustion state using the throttle motor 304.

The engine system further includes an idle rotating speed control system. The idle rotating speed control system controls a first idle rotating speed corresponding to the engine cooling water temperature, and the idle rotating speed after warm-up of the engine. Under the idle rotating speed control, the intake air flow rate is calculated based on signals from the air flow meter 202 and the vacuum sensor 306, and the engine ECU 1000 calculates the optimum opening degree of the throttle valve 300 and the optimum injector opening timing such that the idle rotating speed becomes close to the target value.

The idle rotating speed may be controlled using an idle speed control valve (not shown in FIG. 1) other than the aforementioned idle rotating speed control using the throttle motor. The idle speed control valve adjusts the flow rate of air flowing through the bypass passage of the throttle valve so as to control the idle rotating speed.

The engine system further includes a canister purge control system that introduces the fuel evaporation gas generated in the fuel tank 400 to an intakeport so as to be burned. The canister purge quantity is controlled by the engine ECU 1000 in accordance with the engine operation state for controlling the operation state of a canister purge VSV (Vacuum Switching Valve) 406. At this time, the engine ECU 1000 outputs the duty signal to the canister purge VSV 406 such that its opening degree is controlled.

The engine system further includes an air flow control valve system which executes an optimum control of the air flow within the combustion chamber by closing one of two independent intake ports in accordance with the engine cooling water temperature and the engine operation state so as to stabilize the combustion and to improve the performance. An air flow control valve 600 is provided for one of the independent intake ports, which is operated upon receipt of the signal from the engine ECU 1000. Closing one port may increase the speed at which the intake air flows through the other port, thus intensifying the turbulence in the lateral direction of the combustion chamber. This makes it possible to accelerate spray atomization of the fuel at the low water temperature, resulting in stabilized combustion. Even in the area at low engine speed and high load, the volume efficiency and the combustion efficiency are improved, resulting in higher performance. The engine ECU 1000 determines the opening degree of an air flow control valve 600 based on the engine speed, engine cooling water temperature, load signal and the like. The negative pressure applied to a diaphragm chamber of the actuator via an air flow control valve VSV 602 is changed to operate the air flow control valve 600.

Figure 4:
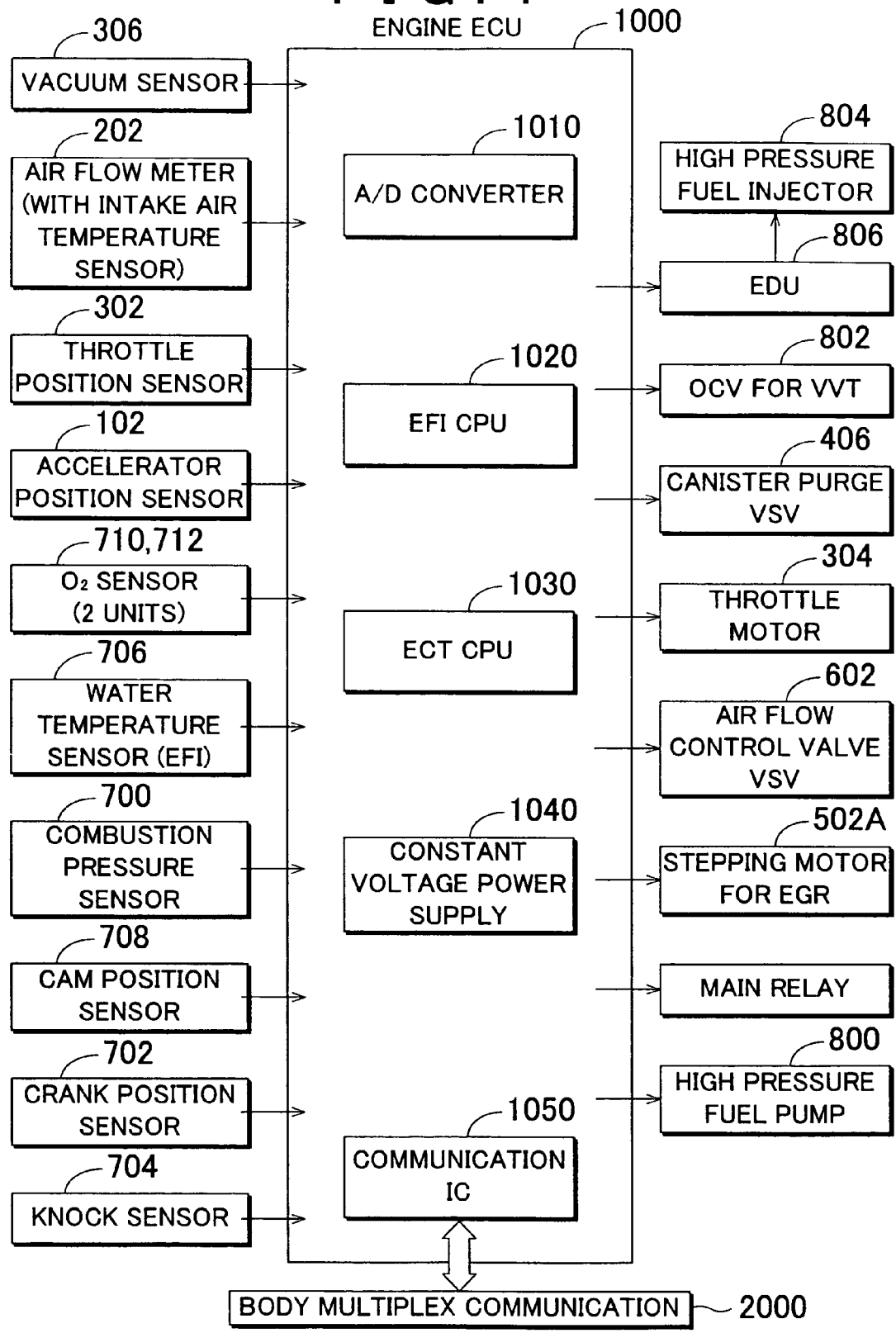
FIG. 4 is a control block diagram of the vehicle to which the EGR failure diagnosis system according to the embodiment of the invention is applied.

FIG. 4 is a control block diagram that includes the engine ECU 1000, various sensors and actuators for controlling the engine system.

The engine ECU 1000 includes an A/D (Analog/Digital) converter 1010 that converts analog signals from various sensors into digital signals, an EFI (Electronic Fuel Injection) CPU (Central Processing Unit) 1020, an ECT (Electronically Controlled Automatic Transmission) CPU 1030, a constant-voltage power supply 1040 that supplies electricity to the aforementioned CPUs, and a communication IC (Integrated Circuit) 1050 that is used for communication with a body multiplex communication 2000.

Sensors for inputting various signals to the engine ECU 1000 will be described hereinafter.

An accelerator position sensor 102 attached to an accelerator pedal detects a depression amount of the accelerator pedal. An accelerator position sensor of linear type may be employed, which is capable of providing a linear output voltage with respect to the depression amount of the accelerator pedal.

An air flow meter of hot wire type provided within an intake air temperature sensor may be employed as the air flow meter 202 for measuring the intake air flow rate. The engine ECU 1000 calculates the flow rate of the intake air supplied to the engine based on the preliminarily stored relationship between the output voltage of the air flow meter 202 and the flow rate.

The throttle position sensor 302 may be attached to a throttle body, for example, so as to detect the opening degree of the throttle valve 300. An electronic position sensor using a hall element makes it possible to realize accurate control as well as lasting reliability.

The vacuum sensor 306 may be a pressure sensor that detects the pressure within the intake pipe. The combustion pressure sensor 700 detects the pressure within the combustion chamber of each of the cylinders upon combustion.

An electromagnetic pick-up type sensor with high detection accuracy may be employed as the crank position sensor 702 for detecting a crank angle. As the crank shaft rotates, the air gap between the protrusion of the crank shaft timing rotor attached to the crank shaft and the crank position sensor is changed. Accordingly the magnetic flux that passes through the coil portion of the crank position sensor varies, resulting in electromotive force generated in the coil portion. The direction of the thus generated voltage measured when the protrusion of the timing rotor approaches the crank position sensor is inverted when the protrusion moves away from the crank position sensor. The alternating voltage as the voltage generated as above serves to detect the crank position and the crank angle speed.

The water temperature sensor 706 detects a temperature of the engine cooling water. The cam position sensor 708 attached to a rear end of the cylinder head detects the protrusion of the cam shaft timing rotor fixed to the intake cam shaft so as to distinguish the cylinder and to detect the actual cam shaft angle. Likewise the crank position sensor 702, the accurate electromagnetic pick-up type sensor may be employed as the cam position sensor 708.

The knock sensor 704 detects knocking of the engine. The $O_2$ sensor 710 detects an oxygen concentration of the exhaust gas at the upstream engine side of the catalytic converter. The $O_2$ sensor 712 detects an oxygen concentration of the exhaust gas at an area between the three-way catalytic converter 900 at the upstream side and a three-way catalytic converter 902 at the downstream side.

The actuator that receives control signals from the engine ECU 1000 will be described.

An EGR stepping motor 502A serves to adjust an opening degree of the EGR valve 502 for the EGR device upon receipt of the control signal from the engine ECU 1000. The air flow control valve VSV 602 serves to operate the air flow control valve 600 in accordance with the operation state of the engine. The negative pressure applied to the diaphragm chamber of the actuator is changed via the air flow control valve VSV 602 based on the control signal output from the engine ECU 1000 for operating the air flow control valve 600.

An opening degree of a canister purge VSV 406 is controlled upon receipt of the control signal from the engine ECU 1000 so as to adjust the canister purge amount.

An OCV (Oil Control Valve) 802 for VVT (Variable Valve Timing) functions in controlling a phase of the intake cam shaft at an optimum valve timing. The hydraulic pressure from the VVT OCV 802 is applied to the advance angle chamber and the retard angle chamber of the VVT controller so as to rotate a vane portion. Accordingly the phase of the intake cam shaft is continuously varied. The VVT OCV 802 is allowed to adjust the oil supply to the advance angle chamber and the retard angle chamber of the VVT controller by controlling the position of the spool valve based on the duty signal from the engine ECU 1000.

A high pressure fuel pump 800 is attached to a cylinder head cover for pressurizing the fuel, and driven by a cam attached to the intake cam shaft. The engine ECU 1000 variably controls the high pressure fuel pump such that the pressure of the high pressure fuel is brought into the value in accordance with the operation state of the engine. In the system, the fuel may be discharged by the required quantity under the control of the electromagnetic valve. This makes it possible to reduce the driving torque as well as the noise.

The high pressure fuel pump 800 is formed of an electromagnetic valve that serves to open or close the intake passage through which the low pressure fuel flows from the fuel tank 400, a pump plunger that is driven by the cam shaft to apply pressure to the fuel, and a check valve that mechanically opens or closes the passage communicated with a fuel delivery pipe. The high pressure fuel pump 800 introduces the fuel by operating the pump plunger up and down such that the fuel is pressurized. The high pressure fuel injector 804 as a high pressure slit nozzle fuel injector includes a slit nozzle by which the highly atomized fuel is injected into the combustion chamber while spreading widely like a fan.

An EDU (Electronic Driver Unit) 806 is employed for operating the high pressure fuel injector 804 accurately at high speeds. The EDU 806 controls the high pressure fuel injector 804 by converting the injection request signal sent from the engine ECU 1000 into the injector signal at high voltage and high current.

The EGR valve 502 of the EGR device is operated with the poppet valve 502C driven by the stepping motor 502A as aforementioned. The EGR valve 502, however, is not limited to the one as aforementioned. It may be of air control type, which includes an air actuator provided with a solenoid valve and a diaphragm rather than the electric actuator such as the stepping motor 502A.

The control routine of the program executed by the engine ECU 1000 that realizes the EGR failure diagnosis system according to the embodiment of the invention will be described referring to the flowchart of FIG. 5.

In step (hereinafter referred to "S") 100, it is determined whether a monitor condition has been established by the engine ECU 1000 based on the vehicle speed, engine speed, intake air flow rate, and throttle opening degree, for example. More specifically, when the vehicle is stopped, it is determined that the monitor condition is not established. If it is determined that the monitor condition has been established, that is, YES is obtained in S100, the process proceeds to S110. If NO is obtained in S100, the process proceeds to S220.

In S110, the engine ECU 1000 brings a VVT to the most retarded position. As the VVT becomes the most retarded position, that is, the valve overlap amount becomes minimum, the pressure within the intake pipe is reduced to be minimum. The change in the pressure within the intake pipe or the intake pipe pressure upon change in the operation state of the EGR device from OFF to ON state becomes the largest.

In S120, it is determined whether a predetermined time has been elapsed from the time when the VVT is fixed to the most retarded position by the engine ECU 1000. If the predetermined time has been elapsed from the time when the VVT is fixed to the most retarded position, that is, YES is obtained in S120, the process proceeds to S130. If NO is obtained in S120, the process is brought into a standby mode until the predetermined time elapsed.

In S130, the engine ECU 1000 outputs the control signal (valve opening signal) to the EGR valve 502 so as to start the EGR operation.

In S140, it is determined whether a predetermined time has been elapsed from the start of the EGR device by the engine ECU 1000. If the predetermined time has been elapsed from the start of the EGR device, that is, YES is obtained in S140, the process proceeds to S150. If NO is obtained in S140, the process is brought into the standby mode until the predetermined time elapses.

In S150, the engine ECU 1000 measures the intake pipe pressure PMON (actual measurement value) based on the signal from the vacuum sensor 306. In this case, the PMON to be measured represents an absolute pressure (vacuum=0 kPa, normal atmospheric pressure=101.3 kPa) as a positive value.

In S160, the engine ECU 1000 outputs the control signal (valve closing signal) to the EGR valve 502 to stop the EGR device (cut EGR operation).

In S170, it is determined whether a predetermined time has been elapsed from the cut of the EGR operation by the engine ECU 1000. If the predetermined time has been elapsed from the cut of the EGR operation, that is, YES is obtained in S170, the process proceeds to S180. If NO is obtained in S170, the process is brought into the standby mode until the predetermined time elapses.

In S180, the engine ECU 1000 measures the intake pipe pressure PMOFF (actual measurement value) based on the signal from the vacuum sensor 306.

In S190, it is determined whether the difference between values PMON and PMOFF (PMON−PMOFF) is larger than a predetermined judgement value. If it is determined that the value PMON−PMOFF is larger than the predetermined judgment value, that is, YES is obtained in S190, the process proceeds to S200. If NO is obtained in S190, the process proceeds to S210. The exhaust gas is recirculated into the intake manifold when the EGR device is normally operated. If the measurement value PMON as the intake pipe pressure in ON state of the EGR device becomes larger than the value obtained by adding the judgment value to the actual measurement value PMOFF, it is determined that the EGR device is normally operated.

In S200, the engine ECU 1000 determines whether the EGR device is normally operated. When an EGR abnormality alarm lamp (it may be an engine abnormality alarm lamp including the EGR abnormality alarm) has been turned ON, it may be turned OFF. In S210, the engine ECU 1000 determines whether the EGR device is abnormally operated. The ECU 1000 turns the EGR abnormality alarm lamp ON or stores the failure identification code (diag code) in the memory.

In S220, the engine ECU 1000 releases fixation of the VVT at the most retarded position.

The operation of the above-structured EGR failure diagnosis system according to the embodiment based on the control program represented by the flowchart will be described hereinafter. The operation to be described is assumed that the EGR failure diagnosis system is realized with the program executed by the engine ECU 1000.

Upon establishment of the monitor condition during the vehicle engine operation, that is, YES is obtained in S100, the valve operation timing is fixed to the most retarded position under the VVT control in S110. Upon elapse of a predetermined time, that is, YES is obtained in S120, the EGR device is started in S130. In this case, the EGR valve 502 is opened such that the exhaust gas is supplied into the intake system through the EGR pipe 500.

Upon elapse of a predetermined time from start of the EGR device, that is, YES is obtained in S140, the actual measurement value of the intake pipe pressure PMON is detected by the vacuum sensor 306. After measurement of the PMON, the EGR operation is cut in S160. Upon elapse of a predetermined time, that is, YES is obtained in S170, the actual measurement value of the intake pipe pressure PMOFF is detected by the vacuum sensor 306 again.

The actual measurement value PMON represents the intake pipe pressure when the EGR device is operated, and the actual measurement value PMOFF represents the intake pipe pressure when the EGR device is not operated. If the difference between the PMON and the PMOFF (PMON−PMOFF) is larger than a judgment value, that is, YES is obtained in S190, it is determined that the EGR device is normally operated, and the intake pipe pressure is increased by the exhaust gas supplied from the exhaust system to the intake system. It is, thus, determined that the EGR device is in a normal state in S200.

Meanwhile, if the difference between the PMON and the PMOFF (PMON−PMOFF) is equal to or smaller than the judgement value, that is, NO is obtained in S190, it is determined that the EGR device is not normally operated in S210. In this case, the EGR device is assumed to have the failure caused by, for example, lock of the poppet valve 502C of the EGR valve 502 or clogging of the EGR pipe 500.

The engine ECU according to the embodiment executes the program stored therein for performing the EGR failure diagnosis function. Upon performance of the EGR failure diagnosis function for the engine equipped with the system capable of changing the operation timing of the intake/exhaust valve, the timing control for the operation of the intake/exhaust valve is interrupted such that the failure diagnosis with respect to the EGR device is executed. This makes it possible to execute the failure diagnosis with respect to the EGR device accurately based on each change in the pressure and the flow rate in the cases where the EGR device is operated and the EGR device is not operated while preventing the change in the intake air flow rate or the change in the intake air pressure in the intake system caused by the factor other than the EGR device.

Figure 5:
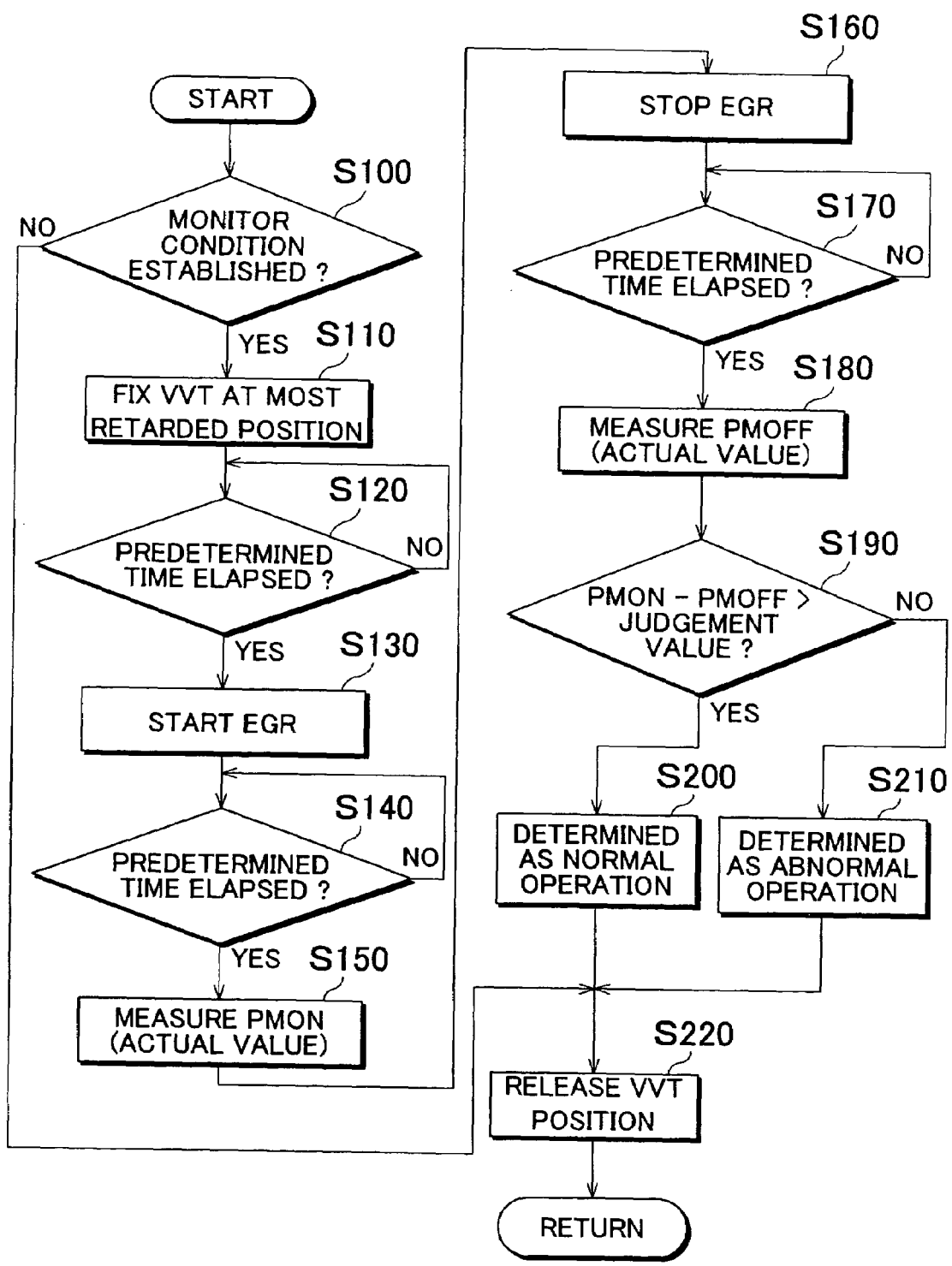
FIG. 5 is a flow chart representing a control routine of a program executed by an engine ECU for realizing the EGR failure diagnosis system according to the embodiment of the invention.

In the control routine shown in the flowchart of FIG. 5, the intake pipe pressure is used for the failure diagnosis with respect to the EGR device. However, assuming that the opening degree of the throttle valve 300 is constant, the failure diagnosis with respect to the EGR device may be performed based on the change in the intake air flow rate within the intake pipe detected by the air flow meter 202. In this case, as it is assumed that the opening degree of the throttle valve 300 is fixed, the increase in the intake pipe pressure in the normal operation state of the EGR device is greater than that in the stopped state of the EGR device. In the normal operation state of the EGR device, thus, the intake air flow rate is decreased. If the intake air flow rate detected by the air flow meter 202 in the operation state of the EGR device is smaller than the intake air flow rate detected by the air flow meter 202 in the stopped state of the EGR device by the amount in excess of the judgement value, it may be determined that the EGR device is in the normal state.

In the embodiment, the failure diagnosis with respect to the EGR device is performed by temporarily interrupting the control for changing the operation timing of the intake/exhaust valve. It is to be understood that the invention is not limited to the aforementioned process.

In the case where the lift amount of the intake/exhaust valve is variable in the control system, the failure diagnosis with respect to the EGR device may be performed by preventing the change in the lift amount of the valve.

The failure diagnosis with respect to the EGR device may be performed in the state where the opening degree of the throttle valve 300 is made constant by keeping the control signal to the throttle motor 304 constant.

The failure diagnosis with respect to the EGR device may be performed in the state where the opening degree of the idle speed control valve is made constant, that is, with no need of changing the duty signal sent from the engine ECU 1000 to the idle speed control valve.

The failure diagnosis with respect to the EGR device may be performed by preventing the canister purge VSV 406 from being operated.

The failure diagnosis with respect to the EGR device may be performed by preventing the fuel injection control system from changing the time for applying electricity to the injector. The failure diagnosis with respect to the EGR device may be performed by preventing the ignition timing control system from changing the ignition timing signal sent to the igniter.

The failure diagnosis with respect to the EGR device by fixing the operation of the flow control valve system.

Either of the aforementioned controls may give an influence to the combustion within the combustion chamber of the engine. Accordingly, such control is stopped or interrupted to prevent the change in the intake air flow rate (pressure, flow rate) in the intake system caused by the factor other than the EGR device such that the failure of the EGR device may be accurately determined based on each change in air of the intake system (pressure, flow rate) in the cases where the EGR device is operated and the EGR device is not operated.

While a preferred embodiment of the invention has been described using specific terms, such description is for illustrative purposes only, and it is to be understood that changes and variations may be made without departing from the spirit or scope of the following claims.

What is claimed is:

1. A failure diagnosis system for an exhaust gas recirculation device provided in an internal combustion engine for recirculating a part of an exhaust gas into an intake pipe of the internal combustion engine via a recirculation valve, comprising:
   a detection unit that detects a condition of air flowing through the intake pipe of the internal combustion engine;
   a control unit that interrupts a control executed by a variable intake air flow rate device that varies a flow rate of intake air introduced into a combustion chamber of the internal combustion engine; and
   a diagnosis unit that diagnoses a failure in the exhaust gas recirculation device, wherein the control unit sets a variable valve timing mechanism to the most retarded position before the detection unit detects the condition flowing through the intake pipe, and the diagnosis of the diagnosis unit is based on the detected condition of air.

* * * * *